United States Patent [19]
Clark et al.

[11] 4,098,153
[45] Jul. 4, 1978

[54] MACHINING METHOD

[75] Inventors: William Thomas Clark, Birstall; Edward Colin Partington, Buckminster, both of England

[73] Assignee: The Products Engineering Research Association of Great Britain, Melton Mowbray, England

[21] Appl. No.: 632,821

[22] Filed: Nov. 17, 1975

Related U.S. Application Data

[63] Continuation of Ser. No. 225,925, Feb. 14, 1972, abandoned.

[51] Int. Cl.² .......................... B23B 1/00; B23C 1/00
[52] U.S. Cl. ..................................... 82/1 C; 90/11 C
[58] Field of Search ........................... 82/1 C, DIG. 1; 219/69 M; 90/11 C

[56] References Cited
U.S. PATENT DOCUMENTS

| | | | |
|---|---|---|---|
| 2,654,821 | 10/1953 | Gillett | 82/1 C |
| 2,861,166 | 11/1958 | Cargill | 82/1 C |

FOREIGN PATENT DOCUMENTS

| | | | |
|---|---|---|---|
| 780,242 | 7/1957 | United Kingdom | 219/69 M |

OTHER PUBLICATIONS

"Hot Machining" by I. A. Dickter, Mechanical Engineering, Jan. 1964 pp. 37–41.
"Machining with a Plasma Jet" by J. A. Browning, Metalworking Production, Sep. 12, 1962 pp. 82 & 83.

*Primary Examiner*—Leonidas Vlachos
*Attorney, Agent, or Firm*—Holman and Stern

[57] ABSTRACT

In the hot-machining of metallic workpieces localized heating of the workpiece by a plasma torch is achieved immediately preceeding a cutting tool. Pure argon gas is used as the plasma gas in the heating plasma torch, and the electrical power input to the plasma gas is kept within an operative range up to 10 kilowatts.

3 Claims, 4 Drawing Figures

MACHINING METHOD

This ia a continuation of application Ser. No. 225,925 filed Feb. 14, 1972 now abandoned.

The present invention is concerned with a method of hot-machining a workpiece.

Hitherto, where a workpiece has been sufficiently hard to be un-machinable using conventional machine tools, hot-machining has been used. In hot-machining a portion of the workpiece is heated to render it malleable, the thus malleably rendered portion being removed thereafter by a separate cutting tool which may be a conventional tool.

Many different types of heating have been used as the heat source for hot-machining and these include flame heating, resistance heating and high frequency heating. Proposals have been made also to use plasma heating, one such reference being that contained on the final page of an article entitled "High Temperature Machining" which appeared in "The Tool and Manufacturing Engineer" dated November, 1960, in which it is suggested that a plasma torch may be suitable for hot-machining but that the disadvantages of a plasma torch of excessive noise and light would need to be overcome. These disadvantages arise because of the necessity, when a plasma torch is used in cutting or welding, for example, of imparting as much heat as possible to a workpiece because in both instances workpiece material must undergo a change of state, i.e. melting before the workpiece can be cut or welded. Thus, as maximum a volume as possible of plasma gas is caused to flow through a plasma torch, thus giving rise to supersonic or ultrasonic gas flow velocities which create excessive noise.

One or more of the following advantages may be attained: higher machining speeds; higher feed rates; lower machine power; longer tool life, Thus, Nimonic (Registered Trade Mark) 115, work hardening chrome manganese steel, and tool steel hardened and tempered to 650 VPN, may be machined in accordance with the method of the invention, at speeds in the region of ten times the speeds at which they are machined by conventional methods. The method of the invention enables all of these metals to be machined at surface speeds of the order of 500 ft/min; the conventional surface speeds of these metals during machining are, respectively: 30 ft/min (max); 40 ft/min; un-machinable.

Preferably, the cutting tool used in the method of the invention has a ceramic, 'cermet' or carbide cutting tip, the latter conveniently being coated with one or more hard surface layers of carbides, nitrides or a ceramic. In any event, the tool is preferably of the chip-forming type.

The invention will now be described further by way of example with reference to the accompanying drawings in which.

Figure 1:
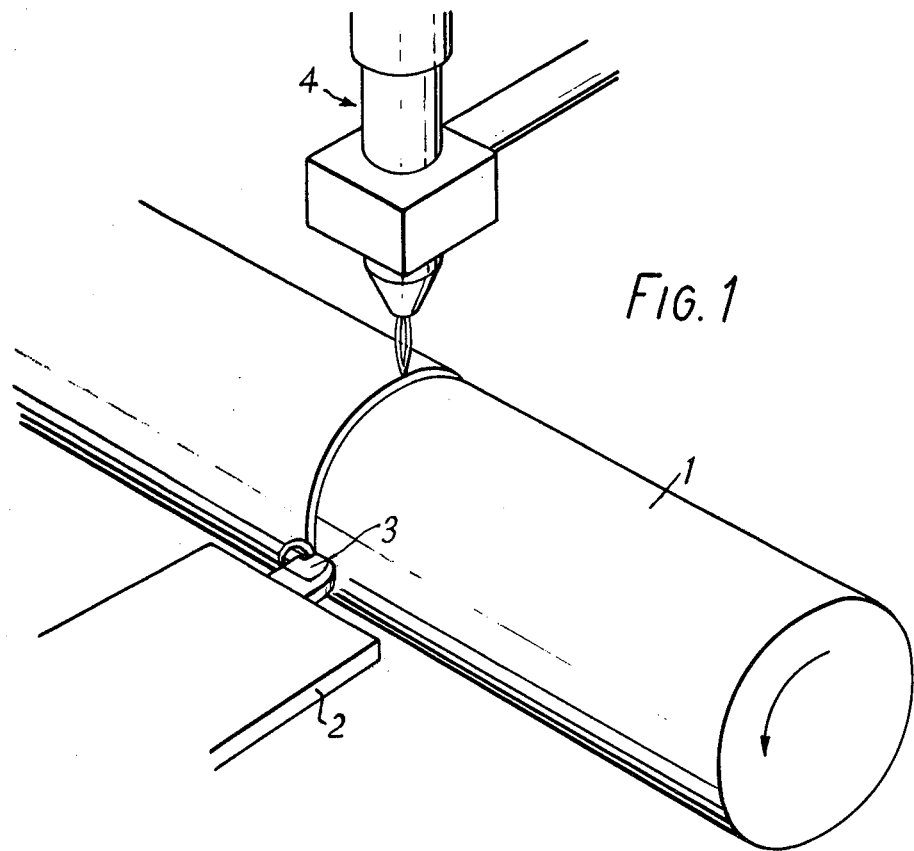
FIG. 1 is a simplified perspective view of a cylindrical workpiece in the course of a machining operation performed in accordance with the invention.

Referring first to FIG. 1 of the drawings, a cylindrical workpiece 1 is mounted in a lathe and rotated at high speed in the direction indicated. A cutting tool 2 having a ceramic tip 3 is positioned adjacent the rotating workpiece to remove a predetermined depth of material therefrom. Thus, the tip 3 reduces the diameter of the workpiece as indicated.

In accordance with the invention, a constricted arc heating device 4 imparts intense localized heating to the workpiece 1 immediately in advance of the cutting tool 2. The effect of this heat is to reduce the strength of the workpiece material immediately before it is removed.

In this particular example, the heating device 4 is constituted by a plasma torch.

Figure 2:
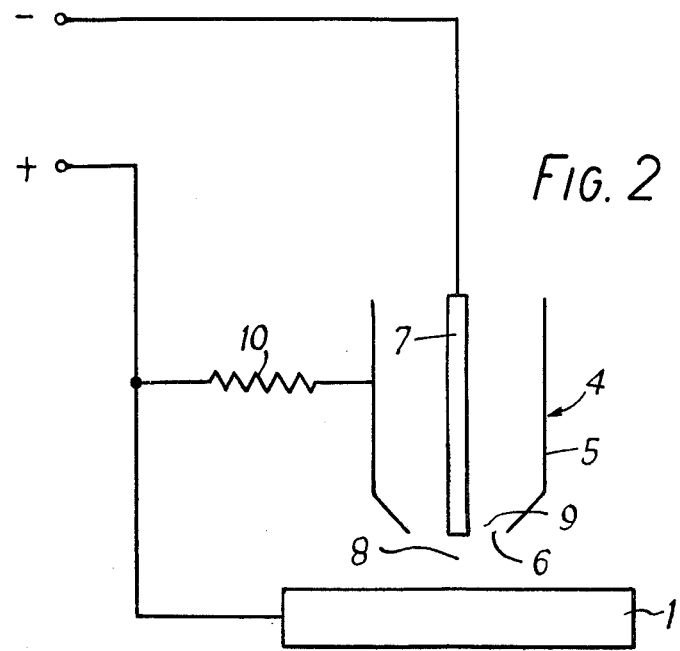
FIG. 2 is a diagrammatic illustration of the plasma torch used in FIG. 1, showing the electrical circuit connections thereto.

FIG. 2 of the drawings diagrammatically illustrates the torch 4 of FIG. 1. As can be seen, it comprises an external casing 5 which defines a nozzle 6 at its lower end, and a main electrode 7 mounted axially in the casing, as is conventional in such torches, provision is made to supply gas (in this case argon) to the casing 5 to produce a shroud for the arc in use. Cooling water is also supplied.

In normal operation, a D.C. power supply from an appropriate supply unit is connected between the electrode 7 and the workpiece 1, and an electrical arc 8 is established between these two components. To maintain a pilot arc 9 in the event that the main arc 8 is extinguished, a resistor 10 is connected between one side of the supply and the casing 5, the pilot arc being established between the electrode 7 and the casing 5 at the nozzle.

Figure 3:
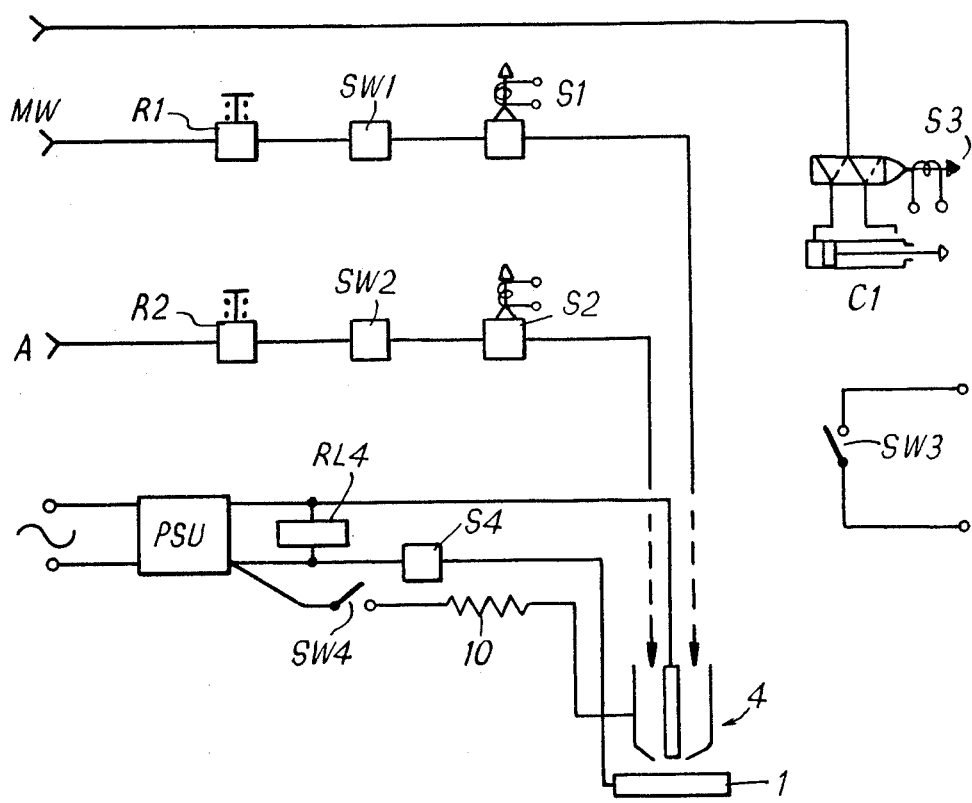
FIG. 3 is a diagrammatic illustration of the service supplies for the apparatus of FIG. 1.

Turning now to FIG. 3 of the drawings, the torch of FIG. 2 is shown at 4. P.S.U. indicates the power supply unit connected to the torch and is supplied with current from an alternating source (e.g. 250 v. at 50 Hz). Connected across the output of the power supply unit is a voltage sensitive relay RL4. A solenoid-operated switch S4 is also provided in one of the output loads of P.S.U. The resistor 10 is controlled by a manually operated switch SW4.

In FIG. 3, MW indicates the mains water supply to the torch, the supply line including a manually operable switch R1, a pressure switch SW1 and a solenoid-operated switch S1. Similarly, the argon supply to the torch is indicated at A, the supply line including switches R2, SW2 and S2.

FIG. 3 also indicates the mains air supply MA to the saddle drive C1 of the lathe. The air supply is controlled by a solenoid-operated switch S3. Finally, a switch controlled by the lathe spindle lever is indicated at SW3.

Figure 4:
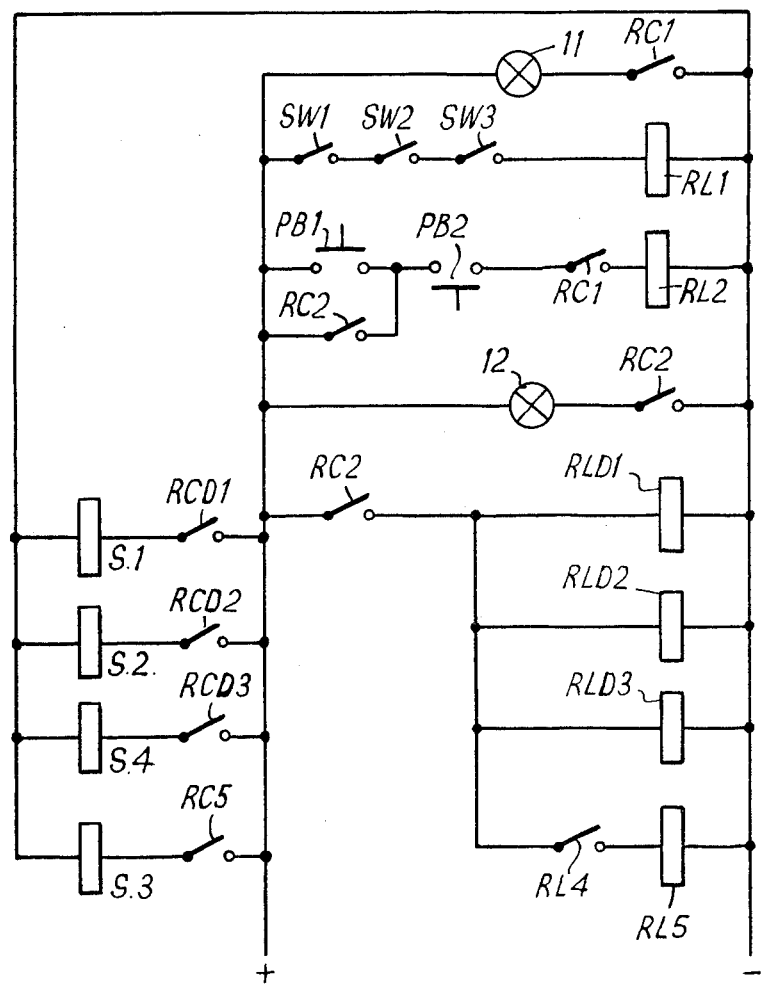
FIG. 4 shows the control circuit for the services of FIG. 3.

FIG. 4 illustrates the control circuit for the services of FIG. 3.

This circuit includes the switches SW1, SW2 and SW3 of FIG. 3. The solenoids operating switches S1, S2, S3 and S4 of FIG. 3 are designated by the same symbols as the switches.

FIG. 4 also includes a start button PB1 and a stop button PB2, two relays RL1 and RL2, the contacts of which are designated RC1 and RC2 respectively. It also includes three delay-off relays RLD1, 2 and 3, the contacts of which are designated RCD1, 2 and 3 respectively. The delay built into the relays is as follows:

RLD1 — 60 seconds; RLD2 — 30 seconds; RLD3 — 0 - 5 seconds.

In other words, if RLD 1 is de-energized there will be a sixty second delay before its contacts close. A fourth (no delay) relay RL5 in the delay section of the circuit has contacts RC5.

Finally, the circuit includes two indicator lamps 11 and 12, the first of which indicates a ready condition and the second indicates when the main arc is established.

The sequence of operation of the equipment so far described is as follows:

1. Switch S4 is closed to establish the pilot arc 9 between the casing 5 and the electrode 7 of the torch.
2. Unit P.S.U. is adjusted to provide the appropriate power level for the main plasma arc, when established. The particular level is determined by the work material being machined, depth of cut required, etc.
3. Valve R1 in the mains water supply is opened manually, pressure switch SW1 closing when the pre-set pressure is reached.
4. Similarly, valve R2 in the Argon supply is opened and SW2 closes when the pre-set pressure is reached.
5. The spindle lever of the lathe is operated to rotate the workpiece, thereby closing SW3. As can be seen from FIG. 4, this sequence energizes relay RL1 and closes its contracts RC1, thereby illuminating the 'ready' lamp 11.
6. The positions of the torch and cutting tool are now set in relation to one another and to the workpiece according to the particular cutting operation to be performed.

In those cases where the depth of cut is large in relation to the distance between the plasma torch nozzle and the workpiece surface, it may be desirable to incline the torch so as to impinge on the face being cut by the cutting tool rather than the diameter being removed by the cutting tool. In another case, e.g. copy turning, it may be necessary to set the torch to coincide with the junction of the radial and axial surfaces.

Whatever operation is performed, the relative positioning of the main plasma arc and the cutting tool must be such that the heating of the workpiece which results from the main arc is effectively ahead of the cutting tool with respect to the cutting direction, the amount depending on the nature of the cut to be made. However, in most cases, this setting is not very critical and may range froma a few millimeters to 1 meter (circumferential distance).

In any event, the aqueous continues as follows:

7. Switch PB1 is operated to initiate the main arc. Thus, depression of PB1 energizes relay RL3 since RC1 is closed. The relay locks in on itself through contacts RC2 associated with PB1. The 'arc on' lamp 12 is illuminated by the second pair of contacts RC2. The third pair energizes the relays RLD1, 2 and 3 to close their associated contacts to open switches S1, S2 and S4. As soon as the main arc is established, RL4 senses the voltage drop which occurs, thereby closing switch RL4 in FIG. 4 and energizing relay RL5. This closes RC5 and energizes the saddle drive by opening the valve controlled by S3.
8. At the end of the cutting operation, switch PB2 is opened either manually or by a micro switch arranged to operate at the end of the cutting stroke. In either event, this causes relay RL2 to drop out opening its contacts RC2 and extinguishing lamp 12. In addition, this de-energizes relays RLD 1, 2 and 3. These relays then drop out in turn after their appropriate delay periods have expired, assuming the main arc is not re-established in the meantime by operation of switch PB1. Thus, the supplies of gas and water to the torch are maintained for a sufficient length of time after the arc has been extinguished, to ensure adequate cooling of the torch.

It will be appreciated that the pilot arc is present throughout this sequence. If desired, arrangements can be made for it to be extinguished during the cutting operation. For example, relay RL4 which senses when the main arc is established, can be arranged to cut off the pilot arc. It could then be re-established, for example, by depression of PB2. Alternatively the operator can perform this function manually.

As will be evident, by adaptation, the system described can be used for facing operations, i.e. in those cases where the tool is fed normal to the rotational axis of the workpiece. Likewise, the system described can be adapted for other turning operations such as boring and trepanning with suitable arrangement of the equipment and controls, and the system can be applied to both horizontal turning machines, e.g. center lathes, turret lathes, as well as vertical turning machines, such as vertical boring and turning mills.

The operation described with reference to the drawings applies to a cylindrical turning operation in which cutting takes place continuously. However, there are many instances in which interrupted cutting must be performed. The simplest example is where repeated cuts must be taken along a workpiece; in this case the cutting operation must be interrupted when the tool reaches the end of the workpiece and the tool must then be returned to the beginning of the cutting path. Other interruptions occur in the direction of cut or normal to the direction of cut. For example, a workpiece formed with a plurality of longitudinal slots in its outer surface will provide interruptions in the direction of cut. A workpiece having a peripheral recess in a plane normal to its axis provides interruptions normal to the direction of cutting. This form of interruption also occurs when a plurality of separate workpieces are arranged end to end to be machined successively.

In any event, where interrupted cutting is required, it may be necessary to extinguish or reduce the power of the main arc when the torch reaches a gap in the workpiece so that only a pilot arc is maintained. For example, reduction of a voltage or current change which corresponds to a change in the length of the arc can be used to reduce the arc power. It will be appreciated that the control system required to effect this occurrence will vary according to conditions. In some circumstances for example, fast response solid state control may be desirable.

The basic machining system described above can be adapted to a variety of machine tool applications such as turning, planing, shaping, boring, trepanning, milling, drilling, plano-milling, broaching, etc. Examples of some of these operations will now be briefly referred to.

1. Planing and Shaping Operations

In general, the system as described for turning operations can be adapted to planing and shaping operations except that repetitive cuts are made in rapid succession. In those cases in which cutting takes place in only one direction therefore, the control system may be arranged so that the main arc is extinguished during the return stroke. Where there is a double cutting action (i.e. cutting in both directions), two torches — one for each cutting tool — can be arranged to operate in the same way but in a complementary manner.

It will also be appreciated that because the torch will be positioned ahead of the cutting tool, a slightly longer working stroke may be necessary.

In any event it is to be understood that the system can be applied to the planing of horizontal or vertical surfaces and also for copy planing or shaping.

2. Milling Operations

In the case of milling operations using rotating cutters, the arrangement will depend on the size of the cutter in relation to the cross-sectional area of the main arc. For example, where they are of comparable size (e.g. as with end milling), a single arc leading the cutter may suffice. However, where the cutter is large in relation to the size of the arc it may be necessary to arrange for the workpiece to be heated along a continuous narrow band adjacent to the periphery of the cutter. Alternatively, an individual arc may be provided in association with each tooth on the cutter. In either case, it is essential that the arcs shall not be established when a tooth is not cutting, i,e, after a tooth has completed a cut and before it commences its next cut.

In general, ice milling may be regarded as a form of interrupted cutting.

It will be appreciated that, with adaptation, the invention can be applied to milling on all types of machine on which milling operations can be carried out, e.g. horizontal or vertical milling machines, jig boring, horizontal boring and floor boring machines, plano-milling machines, etc.

3. Broaching Operations

In broaching operations, in which metal is removed by a succession of cutting teeth traversed linearly, a plasma arc can be positioned ahead of each cutting edge, and the operation can be arranged so that as each cutting edge enters the workpiece the arc is extinguished. Where the cross-section of the broach normal to the cutting direction (e.g. when producing a splined bore), consists of a multiplicity of teeth, the arcs lying in a single plane can be arranged to operate simultaneously.

4. Drilling and Trepanning Operations

In the case of drilling and trepanning operations, some departure from the conventional form of cutting tool is necessary in order to cope with the problem of establishing the desired heating effect ahead of a cutting edge while producing a hole in solid material. Briefly, in such an operation performed according to the invention, a rotating torch with a cutting edge attached in the manner of a deep hole drilling tool (e.g. a gun drill) is used. No cutting fluid supply is however necessary. The plasma torch drilling tool would be fed axially into the workpiece in the same way as a gun drill; it may be necessary to periodically withdraw the tool in order to clear drilling swarf.

By way of illustration, the following are a series of test results obtained in experiments designed to contrast hot machining with a conventional cold machining technique.

In the tests which hot machining was employed, the workpiece was heated with a constricted-arc torch constructed from a conventional 200-amp TIG welding torch. The torch was used in conjunction with a 300-amp transformer-rectifier arc-welding power unit having an open circuit voltage of 80 volts and a dropping power characteristic. A single stream of pure argon gas was passed through the normal gas shroud passage in the torch body at rates of up to 10 cu.ft.per hour. The plasma nozzle orifice had a diameter in the region of 0.1 inch.

The workpiece was mounted in a lathe, with the plasma torch set close to the workpiece surface so that it was heated very locally. The heated material was removed by conventional turning with a single-point throwaway tip tool.

The torch was operated in the transferred-arc mode, provision being made to complete the current circuit through the workpiece and lathe by means of a brush arrangement making contact with the rotating machine spindle.

The plasma torch was mounted approximately 90° to the lathe tool and approximately at the same axial distance with respect to the workpiece.

The working current was set on the rectifier unit and various work materials were turned using a ceramic tool. The following results were recorded.

Test No. 1

Work Material — Specification: '5.6.2' High Speed Steel
(Hardness 58Rc)
Diameter and length 3in × 2¾ in.
Cutting tool; Ceramic: Kennametal CO6

Plasma Setting

Current : 100 amps
Voltage : 45 volts
Power : 4.5. KW
Cutting Speed : 500 ft/min
Feed Rate : 0.0062 in/rev
Depth of Cut : 0.05 in
Total Axial length (of workpiece) turned satisfactorily : 8¼ in

Test No. 2

As for Test No. 1 but with plasma settings as follows:
Current : 50 amps
Voltage : 45 volts
Power : 2.25 KW
Total Axial length turned satisfactorily : 11 in From Tests 1 and 2 it may be concluded that the plasma power input could advantageously be reduced below 2.25 KW.

Test No. 3

To contrast the results obtained in Tests Nos 1 and 2 with conventional cold machining, Test 1 was repeated, but without plasma heating. The cutting speed was set at 50 ft/min instead of 500 ft/min. The total axial length turned satisfactorily was only 2in.

Test No. 4

Test 1 was repeated using a 2 in diameter × 3½ in long 14% manganese steel workpiece. The total axial length turned satisfactorily was 9 in.

Test No. 5

Again to contrast the invention with cold machining, Test 4 was repeated but without plasma heating. The cutting speed was set at 50 ft/min instead of 500 ft/min. The total axial length turned satisfactorily was only ½ in.

Test No. 6

Test 1 was repeated using a 1¾ in diameter × 4 in long Ninonic 115 workpiece. The total axial length turned satisfactorily was 4 in.

Test No. 7

Again by way of contrast, Test 6 was repeated but without plasma heating and at a cutting speed of 40 ft/min instead of 500 ft/min. The total axial length turned satisfactorily was only ¾ in.

It is anticipated that, for most workpiece materials, an electrical power input in the range of up to 10 KW may be most suitable although it may, in exceptional cases, be necessary to excede this value. The required electrical power input will be determined not ony by the type of material being machined, but also by the size of cut taken by the tool.

We claim:

1. In a method of hot-machining metallic workpieces with a heat-resistant cutting tool including the steps of subjecting successive areas of that workpiece to be machined to intense localized heating with a plasma gas from a transferred arc plasma torch to render said areas malleable, then machining said malleable areas with said heat-resistant cutting tool, the improvement comprising providing pure argon gas as said plasma gas, and adjusting the electrical power input to said plasma gas within an operation range up to 10 kilowatts so as to selectively and successively locally heat said areas to be machined immediately prior to said machining, whereby said argon gas precludes deleterious workpiece surface side effects and permits low electrical power and gas flow rates.

2. The method as set forth in claim 1, further including the step of cooling the workpiece material immediately behind the cutting tool.

3. The method as set forth in claim 1 wherein said plasma torch has a nozzle orifice diameter of approximately 0.1 inch, the plasma gas flow rate is up to 10 cu ft/hr and the electrical power is 4.5 kilowatts.

* * * * *